Patented Aug. 7, 1945

2,381,230

UNITED STATES PATENT OFFICE 2,381,230

PROCESS OF CULTIVATING YEAST WITH TREATED WASTE SULPHITE LIQUOR

Nils Magnus Gunnar Söderström, Spanga, and Helge Fabian Rost, Djursholm, Sweden

No Drawing. Application April 8, 1943, Serial No. 482,350. In Sweden November 22, 1941

14 Claims. (Cl. 195—84)

The present invention comprises a novel process or method for the manufacturing of yeast and has for one object the utilisation of the waste sulphite liquor obtained from digested wood in producing yeast.

Another object of the present invention is the production of marketable yeast of high quality from waste sulphite liquor.

Still another object of the invention comprises a new process for treating waste sulphite liquors to permit yeast propagation therein.

Many attempts have been made to utilise waste sulphite liquor to permit yeast propagation therein, but the known methods have failed to eliminate in the liquor sometimes existing very finely dispersed minute colloidal particles, injurious to the yeast.

Known methods consist in treating hot waste sulphite liquors from digested wood by adding neutralising agents to reduce the acidity of hot liquor from the digester at least to the neutral point, aerating the liquor during treatment until the neutralising reactions are completed, and removing the formed precipitates in one or more steps. Thus a second precipitation is proposd in the prior art, whereby to the already clear liquor is added a quantity of alkali to precipitate yeast-injurious substances.

After painstaking experiments we have, however, found that, depending on the material and on the way the wood is digested in the digesters a certain kind of colloidal minute particles poisonous to yeast may exist in the liquor, even if repeatedly treated in the aforementioned way, and even if the liquor may look entirely clear after repeated treatments with chemicals and corresponding precipitations.

We have found that the injurious colloidal minute particles do not precipitate and do not settle, but remain suspended in the liquor, although they cannot be seen in ordinary light.

If such colloidal particles are present and yeast is propagated therein, a yeast is obtained, that in spite of intensive washing on the surface sooner or later takes on a gray-bluish color, as soon as the surface is exposed. This bluish color can in serious cases occur after a few minutes, while in other cases it does not occur until half an hour or one hour has passed. This disagreeable color alone is sufficient to prevent sales of such yeast as baker's yeast. It has, however, been found that among other things such impure yeast contains lead, probably from the lead lining of the digesters probably in the form of lead sulphide, which is poisonous to man and animal.

The bluish color of the yeast is, however, also accompanied by reduced keeping qualities and disagreeable taste, wherefore such yeast must be considered as unfit for consumption.

It was also previously believed that the indicated disagreeable qualities of the yeast were caused by in the sulphite liquor dissolved poisons suspected to be sulphite-ions or poisonous metal-ions, such as copper-, lead, or arsenium-ions in very small quantities.

We, however, have found that the trouble is not caused by substances dissolved in the sulphite liquor, but by very finely dispersed colloidal particles of a composition not known by us. After careful purification, made in the usual manner by aeration, reduction of the acidity of the liquor by neutralising agents and removal of the obtained precipitates by decantation or centrifuging, the sulphite liquor appears to be entirely clear in passing light. We have discovered that this, apparently clear liquor is frequently contaminated by such invisible, colloidal impurities, which although they may exist in extremely small quantities, cause the above mentioned disagreeable quality of the yeast.

We have further found that said colloids can be eliminated by means of careful filtering. The thus eliminated quantity of impurities is so extremely small that by filtering of hundreds of cubic meters of sulphite liquor prepurified by means of aeration, neutralisation and precipitation, only a coloring of the filtering substance is noticed, but no increase in weight can be observed.

According to the present invention the improved purification of waste sulphite liquor can take place in a process for treating such liquor obtained from digested wood for propagation of yeast after in known way aerating and reducing the acidity of the liquor by adding neutralising agents and removing the obtained precipitates by decantation or centrifuging, which process includes the step of so filtering the liquor through a preferably compressed layer or cake of filtering substance that very finely dispersed minute colloidal particles, injurious to the yeast, will be removed from the liquor by being arrested in said filtering substance.

We prefer a filtering substance of fibrous and preferably of organic origin, for example filtering cellulose or cotton, introduced in filter presses, through which the impure sulphite liquor, preferably by its own weight, is allowed to pass.

The sulphite liquor can thereby be passed repeatedly through the same filter, or through a plurality of the same or different filtering substances.

The filter cellulose can be complemented and/or replaced by wood or sawdust, alumina and/or colloidal silica, magnesium oxide, calcium- or magnesium carbonate or other insoluble inorganic substances in powder form and in compressed layers.

The purification through such filters should be continued until a sample of the filtered liquor, after examination in a Tyndallometer, in which a sharply defined ray of light is passed through the liquor in an otherwise entirely dark room, shows that the liquor is free from colloidal particles.

Excellent results are also obtained, if the filtering step is combined with a dilution of the waste sulphite liquor, obtained by washing the sulphite pulp with water after the waste sulphite liquor has been tapped off from the digester, so that the liquor still contained in the pulp is also recovered in diluted condition. In this manner the total sugar content in the liquor is increased over that normally recovered.

The dilution can further be made before or after the prepurification of the sulphite liquor by aerating, neutralisation and precipitation or centrifuging.

This feature of diluting and filtering is of extraordinary technical importance, because in this way one has means of obtaining a particularly pure and practically sterile substrate for cultivation of yeast, which makes possible the utilisation of practically the whole amount of waste sulphite liquor amounting to about 10 to 12 cubic meters, used for the production of one cubic meter of sulphite pulp.

By using the so-called Z-method, which continuously admits yeast nutrients only in so far as it is absolutely necessary for the rapid propagation of the yeast, and with heavily diluted wort, the best results or returns of yeast is obtained.

We have thus found that the said injurious colloids can be more easily eliminated, if the propagation of yeast and eventually also the purification of the waste sulphite liquor is allowed to take place in diluted condition. The best results should be obtained if the waste sulphite liquor is diluted in such a degree that its content of sugar amounts from 1 to 1.2% instead of normally about 2% in the waste sulphite liquor.

According to an embodiment of the invention for the production of yeast to be used as an albuminous food for animals, the waste sulphite liquor can be fermented for propagation of yeast, if diluted by water, instead of bringing the same to ferment by adding sugar, for example molasses, to the undiluted liquor.

The initial treatment of the waste sulphite liquor can take place in a plurality of ways, which each one shows special advantages and which makes possible variations in the posterior carrying through of the fermentation.

By so-called grading it is in certain cases advisable to eliminate a great amount of the $SO_2$-gas by allowing the hot waste sulphite liquor directly to flow down through a tower of wooden laths, which may be filled with limestone, through which tower the wind is allowed to pass freely. Hereby part of the $SO_2$-gas is blown off, while another part is eventually bound by the carbonate of calcium, whereby it either follows the liquor as sulphite or remains in the limestone, from which it can be removed by spraying with water after terminating the grading step.

The waste sulphite liquor, after having been partly liberated from $SO_2$-gas, can be brought to a container for further aerating and neutralisation. If no limestone has been added to the liquor in the grading tower, it is now charged with great amounts of broken limestone, chalk or chalky clay. The neutralisation with carbonate of calcium is allowed to continue with heavy aerating during a sufficient number of hours in order to obtain a low acidity by means of cheap neutralising means. When the acidity has been lowered sufficiently, lime or other strong base is added. The precipitates and sludge from the neutralisation is eliminated from the liquor by decantation or centrifuging or ordinary filtering.

The liquor is finally according to the invention purified from colloidal minute particles injurious to the yeast by passing it one or several times under its own weight through filter presses, containing compressed layers or cakes of filtering substance, preferably fibrous material, for example cellulose, cotton or the like, which layers or cakes have fairly small interior pores and very extended filtering adherent surfaces around the said pores. The purification through such filters should be continued until a sample of the filtered liquor, after examination in a Tyndallometer, in which a sharply defined ray of light is passed in an otherwise entirely dark room, through the liquor, shows that the liquor is free from colloidal particles. If such particles are still present, such can be seen in the Tyndallometer.

Hereafter the liquor can be prepared for fermentation by cooling to about 30° C., adding nutrietients and diluting, if the liquor has not already been diluted in washing out the waste liquor normally remaining in the pulp.

The inherent sugar content of the diluted and purified waste sulphite liquor can now be used for fermentation in the propagation of added seed yeast and usual nutrients, such as ammonium sulphate, ammonium phosphate, etc., particularly if yeast for feeding animals is desired and which should be used especially for its albumen content.

If, however, baker's yeast of high quality is desired, the sugar content of the purified waste sulphite liquor must be supplemented by other yeast nutrients in the form of sugar, such as purified molasses, wooden sugar, or any of the mineral nutritious materials previously mentioned, in order to obtain a high class yeast.

The explanation of the surprising new technical effect obtained according to the present invention in using compressed substances, of preferably fibrous character, in the filtering step, is that the surface adsorption forces of for example the fibres attract the suspended molecules or minute particles, which after the filtering steps adhere to the surface of the fibres throughout the filter layer or cake. By means of such a filter according to the invention the active surfaces are immensely multiplied, compared to the relatively few injurious particles, which during their passage through the filtering mass are adhered to said surfaces.

A substance not compressed leaving too great distances between the individual fibres cannot eliminate all the colloidal particles. A compressed filtering substance according to the invention never gets clogged from minute particles in its pores. Nevertheless after some time the colloidal purifying action of a compressed filter ceases, although the liquor still freely can pass through the filter. Such purifying action ceases, when the surfaces have lost their adhesion or adsorption forces, due to the colloidal particles now covering said surfaces.

The filter cakes can after ceasing to properly adsorb the colloidal particles be regenerated in the following way.

The compressed layers or cakes are disintegrated in water which may contain sulphuric acid and means of oxidation. After boiling in such a solution, the water is ejected, the fibres are dried and compressed into cakes, which are then ready for new use.

Having now particularly described and ascertained the nature of our said invention and in what manner the same is to be performed, we declare that what we claim is:

1. In a process for treating waste sulphite liquors obtained from digested wood for propagation of yeast, after in known way aerating and reducing the acidity of the liquor by adding neutralizing agents and removing the obtained precipitate, the steps of testing the apparently clear liquor for colloidal impurities, and, when free from finely dispersed invisible colloidal particles injurious to the yeast, conducting the pure liquor to a vat for the propagation of yeast therein.

2. In a process for treating waste sulphite liquors obtained from digested wood for propagation of yeast, after aerating and reducing the acidity of the liquor by adding neutralising agents and removing the obtained precipitate, the steps of testing the thus obtained apparently clear liquor for colloidal impurities, purifying the said liquor from finely dispersed invisible, minute, colloidal particles injurious to the yeast, until a new test for colloidal impurities fails to show any of said colloidal particles, and conducting the pure liquor to a vat for the propagation of yeast therein.

3. In a process for treating waste sulphite liquors obtained from digested wood for propagation of yeast, after aerating, reducing the acidity of the liquor by adding neutralising agents and removing the obtained precipitates, the step of sufficiently filtering the apparently clear liquor through a compressed layer or cake of filtering material so that all the invisible particles of minute and colloidal character finely dispersed in the liquor which are injurious to the yeast are arrested in said filtering substance and removed from the liquor.

4. In a process for treating waste sulphite liquors obtained from digested wood for propagation of yeast, after aerating and reducing the' acidity of the liquor by adding neutralising agents and removing the obtained precipitate, the step of repeatedly filtering the apparently clear liquor through a compressed layer of filtering fibrous substance until all the very finely dispersed, invisible colloidal particles, which are injurious to the yeast, are arrested in the said filtering substance and removed from the liquor.

5. In a process for treating waste sulphite liquors obtained from digested wood for propagation of yeast, after aerating and reducing the acidity of the liquor by adding neutralising agents and removing the obtained precipitate, the steps of filtering the apparently clear liquor through a plurality of compressed layers of filtering substances, in order to arrest in said filtering substances all the very finely dispersed invisible colloidal particles which are injurious to the yeast and thus remove the same from the liquor.

6. In a process for treating waste sulphite liquors obtained from digested wood for propagation of yeast after aerating and reducing the acidity of the liquor by adding neutralising agents and removing the obtained precipitate, the step of filtering the apparently clear liquor through compressed layers of fibrous filtering substance, until an examination of a sample of the filtered liquor by means of a Tyndallometer shows that all finely dispersed invisible, minute, colloidal particles, injurious to the yeast, have been arrested in said filtering substance and removed from the liquor.

7. In a process for treating waste sulphite liquors obtained from digested wood for propagation of yeast after aerating and reducing the acidity of liquor by adding neutralising agents and removing the obtained precipitation, the steps of diluting the liquor with water, and thereafter filtering the apparently clear diluted liquor through compressed layers of filtering substances, until an examination of a sample of the filtered liquor by means of a Tyndallometer shows that all finely dispersed minute colloidal particles injurious to the yeast have been arrested in said filtering substances and removed from the liquor.

8. In a process of cultivating yeast with treated waste sulphite liquor obtained from digested wood by aerating and reducing the acidity of the waste sulphite liquor by adding neutralizing agents and removing the obtained precipitate, the step of filtering the apparently clear liquor through compressed layers of filtering substances until an examination of a sample of the filtered liquor by means of a Tyndallometer shows that all finely dispersed, invisible, minute, colloidal particles injurious to the yeast have been arrested in said filtering substances and removed from the liquor, and using the thus treated liquor to supply yeast nutrients to growing yeast.

9. In a process of cultivating yeast with treated waste sulphite liquor obtained from digested wood by aerating and reducing the acidity of the waste sulphite liquor by adding neutralising agents and removing the obtained precipitate, the steps of diluting the liquor with water, filtering the diluted, apparently clear, liquor through compressed layers of filtering fibrous substance, in order to arrest in said filtering substance all the very finely dispersed, invisible colloidal particles injurious to the yeast and thus to remove the same from the liquor, and using the thus treated liquor to supply yeast nutrients to growing yeast.

10. In a process of cultivating yeast with treated waste sulphite liquor obtained from digested wood by aerating and reducing the acidity of the waste sulphite liquor by adding neutralising agents and removing the obtained precipitate, the steps of filtering the apparently clear liquor through compressed filtering substance, until after critical an examination of a sample of the filtered liquor by means of a Tyndallometer shows that all finely dispersed, invisible, minute, colloidal particles injurious to the yeast have been arrested in said filtering substance and removed from the liquor, supplementing the yeast nutrients present in the liquor by adding other yeast nutrients, and using the thus prepared liquor to supply yeast nutrients to growing yeast.

11. In a process of cultivating yeast with treated waste sulphite liquor obtained from digested wood by aerating and reducing the acidity of the waste sulphite liquor by adding neutralising agents and removing the obtained precipitate, the steps of diluting the liquor with water, thereafter filtering the apparently clear liquor through compressed filtering substance until an examination of a sample of the filtered liquor by means of a Tyndallometer shows that all finely dispersed, invisible, minute, colloidal particles injurious to the yeast have been arrested in said filtering substance and removed from the liquor, supplementing the yeast nutrients present in the liquor by adding other yeast nutrients, adding seed yeast thereto, and using the thus prepared liquor to supply yeast nutrients to the propagating yeast.

12. In a process of cultivating yeast with treated waste sulphite liquor obtained from digested wood, the steps of washing the digested wood with water after taking out the waste sulphite liquor from the digesters in order to extract the available sulphite liquor contained in the digested wood, adding the thus obtained diluted waste sulphite liquor to the previously tapped waste sulphite liquor, aerating and reducing the acidity of the waste sulphite liquor by adding neutralising agents and removing the obtained precipitates, thereafter filtering the apparently clear liquor through compressed filtering substances until an examination of a sample of the filtered liquor by means of a Tyndallometer shows that all finely dispersed, invisible, minute, colloidal particles injurious to the yeast have been arrested in said filtering substance and removed from the liquor, supplementing the yeast nutrients present in the liquor by adding other yeast nutrients, adding seed yeast thereto, and using the thus previously prepared liquor to supply yeast nutrients to the growing yeast.

13. In a process for treating waste sulphite liquor obtained from digested wood for propagation of yeast, after in known way aerating and reducing the acidity of the liquor by adding neutralising agents and removing the obtained precipitate, the steps of purifying the then obtained apparently clear liquor from finely dispersed, invisible, colloidal particles injurious to the yeast and testing samples of the thus purified liquor in a Tyndallometer until the said very finely dispersed, invisible, minute, colloidal particles injurious to the yeast have disappeared, and conducting the thus purified liquor to a vat for the propagation of yeast therein.

14. In a process for treating waste sulphite liquor obtained from digested wood for propagation of yeast, after in known way aerating and reducing the acidity of the liquor by adding neutralisation agents and removing the obtained precipitate, the step of filtering the apparently clear liquor through a so compressed layer of adsorptive fibrous filtering material that all the very finely dispersed invisible, minute, colloidal particles, injurious to the yeast, upon passing through the pores of the said compressed layer are brought within the sphere of attraction of the fibre particles of said compressed layer, and are adsorbed to the adhesive surfaces of the said fibres.

NILS MAGNUS GUNNAR SÖDERSTRÖM.
HELGE FABIAN ROST.